United States Patent
Ramirez et al.

(10) Patent No.: US 9,250,339 B2
(45) Date of Patent: Feb. 2, 2016

(54) SYSTEM AND METHOD TO TRANSPORT DATA FROM A DOWNHOLE TOOL TO THE SURFACE

(75) Inventors: Robert Mack Ramirez, Houston, TX (US); Adebowale Ade-Fosudo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 841 days.

(21) Appl. No.: 13/430,977

(22) Filed: Mar. 27, 2012

(65) Prior Publication Data

US 2013/0261971 A1    Oct. 3, 2013

(51) Int. Cl.
| G01V 1/32 | (2006.01) |
| G06F 17/00 | (2006.01) |
| G01V 11/00 | (2006.01) |
| E21B 47/12 | (2012.01) |

(52) U.S. Cl.
CPC . *G01V 1/32* (2013.01); *E21B 47/12* (2013.01); *G01V 11/002* (2013.01); *G06F 17/00* (2013.01)

(58) Field of Classification Search
CPC ........ G01V 1/32; G01V 11/002; G06F 17/00; E21B 47/12
USPC ............................................................ 702/6
See application file for complete search history.

(56) References Cited

U.S. PATENT DOCUMENTS

| 5,292,127 A * | 3/1994 | Kelly et al. ................ 273/118 A |
| 5,485,148 A | 1/1996 | Tseng |
| 5,991,602 A | 11/1999 | Sturm |
| 6,241,028 B1 * | 6/2001 | Bijleveld et al. ................ 175/40 |
| 6,324,904 B1 * | 12/2001 | Ishikawa et al. ........... 73/152.03 |
| 6,421,298 B1 | 7/2002 | Beattie et al. |
| 6,443,228 B1 | 9/2002 | Aronstam et al. |
| 6,915,848 B2 | 7/2005 | Thomeer et al. |
| 7,017,662 B2 | 3/2006 | Schultz et al. |
| 7,139,218 B2 | 11/2006 | Hall et al. |
| 7,200,070 B2 | 4/2007 | Hall et al. |
| 7,207,396 B2 | 4/2007 | Hall et al. |
| 7,253,671 B2 | 8/2007 | Hall et al. |
| 7,477,162 B2 | 1/2009 | Clark |
| 7,548,068 B2 | 6/2009 | Rawle et al. |
| 7,656,309 B2 | 2/2010 | Hall et al. |

(Continued)

OTHER PUBLICATIONS

Camwell, Acoustic Telemetry, with multiple nodes in drillsting, used to achieve distributed MWD, Drilling Contractor. http://www.drillingcontractor.org/acoustic-telemetry-with-multiple-nodes-in-drillstring-used-to-archieve-distributed-mwd-3625, Conference Paper, Mar. 30, 2012, 5 pages.

(Continued)

*Primary Examiner* — Mohamed Charioui
*Assistant Examiner* — Ruihua Zhang
(74) *Attorney, Agent, or Firm* — Cantor Colburn LLP

(57) ABSTRACT

A system and method to transport data collected in a borehole penetrating the earth to a surface location are described. The system includes one or more measurement tools disposed in the borehole, the one or more measurement tools configured to collect data relating to the borehole and a formation penetrated by the borehole. The system also includes a data node tool disposed in the borehole with a plurality of data nodes, the data node tool being configured to receive the data from the one or more measurement tools, program one or more data nodes with at least a first portion of the data, and eject the one or more data nodes into a fluid stream for transport to the surface location.

14 Claims, 7 Drawing Sheets

(56) References Cited

U.S. PATENT DOCUMENTS

| | | |
|---|---|---|
| 7,668,118 B2 | 2/2010 | Johnson et al. |
| 7,733,240 B2 | 6/2010 | Hall et al. |
| 2002/0185273 A1* | 12/2002 | Aronstam et al. ....... 166/250.01 |
| 2003/0147360 A1 | 8/2003 | Nero et al. |
| 2004/0257241 A1 | 12/2004 | Menger |
| 2005/0011645 A1* | 1/2005 | Aronstam et al. ....... 166/250.11 |
| 2005/0284659 A1 | 12/2005 | Hall et al. |
| 2005/0284663 A1 | 12/2005 | Hall et al. |
| 2006/0062249 A1 | 3/2006 | Hall et al. |
| 2006/0106488 A1* | 5/2006 | Zito .............................. 700/231 |
| 2009/0166031 A1 | 7/2009 | Hernandez |
| 2009/0289808 A1 | 11/2009 | Prammer |
| 2010/0012586 A1* | 1/2010 | Angelescu et al. ........... 210/637 |
| 2012/0103690 A1* | 5/2012 | Patel et al. ...................... 175/57 |

OTHER PUBLICATIONS

Hernandez, Along sting pressure, temperature measurements hold revolutionary promise for downhole management, innovating while drilling, Mar./ Apr. 2009, 5 pages.

International Search Report and Written Opinion for PCT Application No. PCT/US2013/033511, dated Jul. 9, 2013, pp. 1-12.

\* cited by examiner

SYSTEM AND METHOD TO TRANSPORT DATA FROM A DOWNHOLE TOOL TO THE SURFACE

BACKGROUND

Geologic formations can have many uses such as hydrocarbon production, geothermal production, and carbon dioxide sequestration. Logging tools are conveyed through boreholes penetrating the formations in order to perform measurements related to an intended use of the formation. Typically, the logging tools include sensors, transducers and/or transponders used in performing and processing the measurements. Because of the large volume of data that may be collected, transmission of the downhole data to the surface with high resolution presents an issue. Prior methods of conveying data to the surface include mud pulse telemetry. However, by itself, mud pulse telemetry is a low bandwidth solution that limits the efficacy of real-time decision making based on the data. Other methods of sending downhole data to the surface involve transporting the data from downhole via radio frequency identification (RFID) devices or other flowable devices. However, these methods have presented reliability issues related to the programming and release of the flowable devices. Thus, effective and efficient ways to send downhole data to the surface would be appreciated in the drilling industry.

SUMMARY

According to one aspect of the invention, a method executed by a microcontroller of a data node tool to transport data from a downhole tool operating in a borehole penetrating the earth to a receiver at the earth surface includes controlling barriers for loading a data node cartridge of the data node tool with a plurality of data nodes; buffering data collected downhole by the downhole tool and transmitted to the microcontroller; controlling the barriers to release one data node of the plurality of data nodes at a time into a chamber with an antenna; programming the one data node with a portion of the data received from the downhole tool; and controlling the barriers to eject the data node into a fluid stream for transport to the earth surface.

According to another aspect of the invention, a system to transport data collected in a borehole penetrating the earth to a surface location includes one or more measurement tools disposed in the borehole, the one or more measurement tools configured to collect data relating to the borehole and a formation penetrated by the borehole; and a data node tool disposed in the borehole with a plurality of data nodes, the data node tool being configured to receive the data from the one or more measurement tools, program one or more data nodes with at least a first portion of the data, and eject the one or more data nodes into a fluid stream for transport to the surface location.

According to yet another aspect of the invention, a non-transitory computer-readable medium stores instructions which, when processed by a computer processor, cause the processor to perform a method to transport data from a measurement tool operating in a borehole penetrating the earth to a processor at the earth surface via a plurality of data nodes. The method includes controlling barriers for loading a data node cartridge of the data node tool with the plurality of data nodes based on a status of a battery of the data node tool; buffering data collected downhole by the measurement tool and transmitted to the microcontroller; controlling the barriers to release one data node of the plurality of data nodes at a time into a chamber with an antenna; programming the one data node with a portion of the data received from the measurement tool; and controlling the barriers to eject the data node into a fluid stream for transport to the earth surface.

BRIEF DESCRIPTION OF THE DRAWINGS

Referring now to the drawings wherein like elements are numbered alike in the several Figures.

DETAILED DESCRIPTION

While one or more embodiments have been shown and described, modifications and substitutions may be made thereto without departing from the spirit and scope of the invention. Accordingly, it is to be understood that the present invention has been described by way of illustrations and not limitation.

Figure 1:
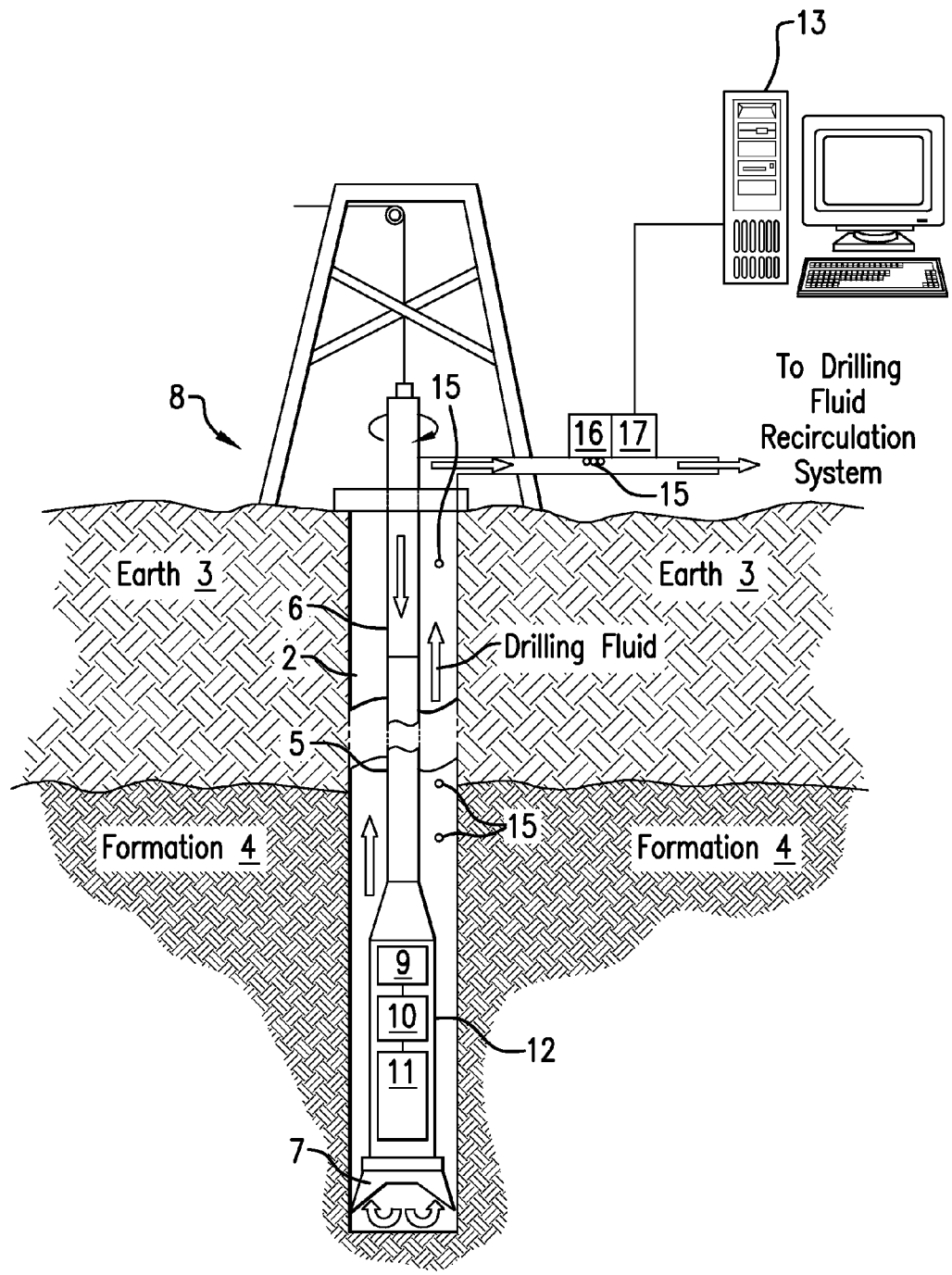
FIG. 1 illustrates a cross-sectional view of an exemplary embodiment of an apparatus including a data node tool.

FIG. 1 illustrates a cross-sectional view of an exemplary embodiment of an apparatus including a data node tool 11. A downhole tool 12 disposed in a borehole 2 penetrating the earth 3, which includes an earth formation 4. The formation 4 represents any subsurface material of interest. The downhole tool 12 is configured to perform one or more types of measurements and is conveyed through the borehole 2 by a carrier 5. In the embodiment of FIG. 1, the carrier 5 is a drill string 6 in an embodiment known as Logging-While-Drilling (LWD). Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. The downhole tool 12 includes one or more Measurement While Drilling (MWD) and Logging While Drilling (LWD) tools 10 for performing the measurements. Downhole electronics 9 may be configured to operate the downhole tool 12, process data obtained by the MWD/LWD tools 10, and interface with telemetry (such as mud pulse telemetry) to communicate data to the computer processing system 13 at the surface of the earth 3. In the embodiment of FIG. 1, the downhole tool 12 also includes a data node tool 11 for transporting data obtained by the MWD/LWD tools 10. The transported data, like the telemetered data, may be processed by the computer processing system 13.

FIG. 1 also shows the parts of the data node system that are at the surface of the earth 3. Specifically, a magnet 16 is used to capture the data nodes 15 from the drilling fluid stream, and a data node reader 17 is used to retrieve the data stored in each data node 15 for processing and/or storage by the computer processing system 13. In the embodiment of FIG. 1, each data node 15 includes a ferrous metal insert 157 (FIG. 2) so that the magnet 16 can be used to capture the data node 15 out of the drilling fluid stream. When the MWD/LWD tools 10 have collected data, the data node tool 11 programs one or more data nodes 15 with at least a portion of that collected data and releases each programmed data node 15 into the drilling fluid stream to be sent up to the surface of the earth 3. Once a data node 15 in the drilling fluid stream has been captured by the magnet 16, the data node reader 17 reads out the data programmed in the data node 15 and sends the data to the computer processing system 13. It can be appreciated that the magnet 16 and data node reader 17 can be referred to as a receiver of the data nodes 15. Although a data node 15 with a metal insert 157 and a magnet 16 for capturing the data node 15 are discussed with respect to the embodiment shown by FIG. 2, it should be understood that, once the data node 15 is in the drilling fluid stream, the present invention contemplates any number of alternate methods of retrieving the data node 15.

Figure 2:
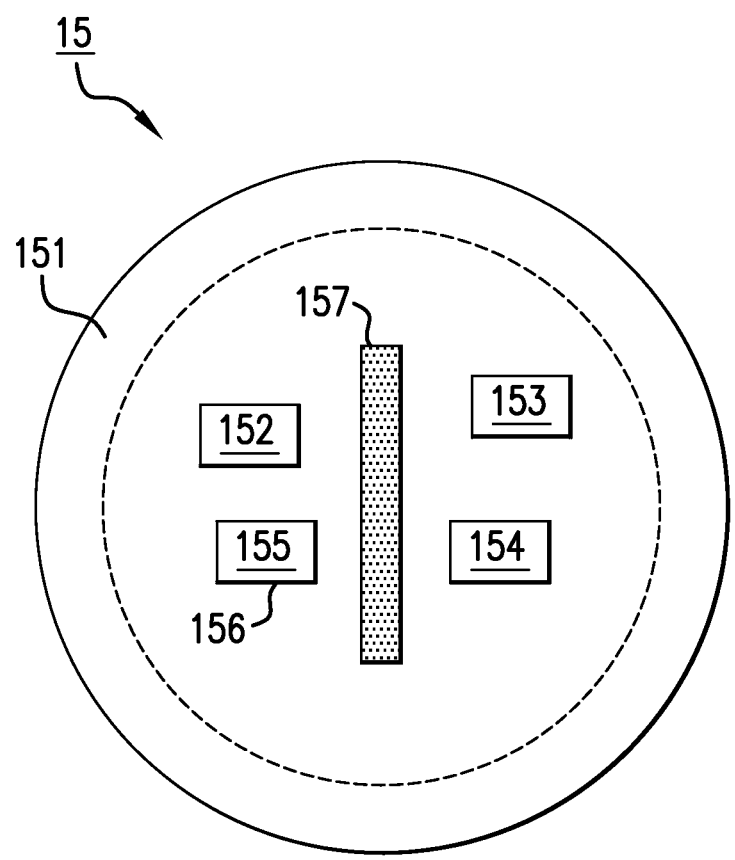
FIG. 2 is a cross-sectional block diagram detailing a data node according to an embodiment of the invention.

FIG. 2 is a cross-sectional block diagram detailing a data node 15 according to an embodiment of the invention. The data node 15 according to the embodiment of FIG. 2 includes a buoyancy chamber 151 that helps the data node 15 float within drilling fluid. The data node 15 also includes memory 152 in the form of one or more memory devices to store the data programmed in the data node 15. The processor 153 of the data node 15 may be implemented as one or more processors in communication with each other. The antenna 154 is used to program the data node 15. The data node 15 also includes a power supply 155, which is a battery 156 in one embodiment. The metal insert 157 is used by the magnet 16 to capture the data node 15 from the drilling fluid.

FIGS. 3-6 illustrate details of the data node tool 11 according to embodiments of the invention. A data node cartridge 19 is pre-loaded with data nodes 15 at the surface prior to deployment in the borehole 2. The mechanism for loading the data nodes 15 into the data node cartridge 19 involves the solenoids 20 and 22 and the barriers 21 and 23 respectively controlled by them. The batteries 26 have charging ports that are sealed when the data node tool 11 is downhole, but when the charging ports are plugged in to charge the batteries 26, the microcontroller 25 senses the charging and opens the barriers 21 and 23, based on control signals to the solenoids 20 and 22, to allow the data nodes 15 to be loaded in the data node cartridge 19. When the charger is unplugged from the charging port, the microcontroller 25 closes the barriers 21 and 23 by signaling the solenoids 20 and 22. In preferred embodiments, the barriers 21, 23 remain closed, as a default, unless the solenoids 20, 22 are signaled to open them.

Once the downhole tool 12 (including the data node tool 11 with pre-loaded data nodes 15) is lowered into the borehole 2, the MWD/LWD tools 10 start collecting data. The microcontroller 25 receives data from the MWD/LWD tools 10 and buffers and packages the data to be sent to the surface. The microcontroller 25 may write data to one or more data nodes 15 after a specified amount of data has been buffered, after a specified length of time, based on a type of data, or based on a specified event. While exemplary triggers for the microcontroller 25 to begin writing data into the data nodes 15 are described herein, alternative embodiments contemplate a variety of triggers for the microcontroller 25 to write data from the MWD/LWD tools 10 to the data nodes 15. The number of data nodes 15 selected by the microcontroller 25 may be based on the amount of data that the microcontroller 25 needs to write and the memory capacity of each data node 15 or the amount of time to program a data node 15. Alternate embodiments contemplate a variety of parameters being used to determine the number of data nodes 15 in which to write the data from the microcontroller 25. The microcontroller 25 may include one or more memory devices and one or more processors in communication with each other.

Figure 3:
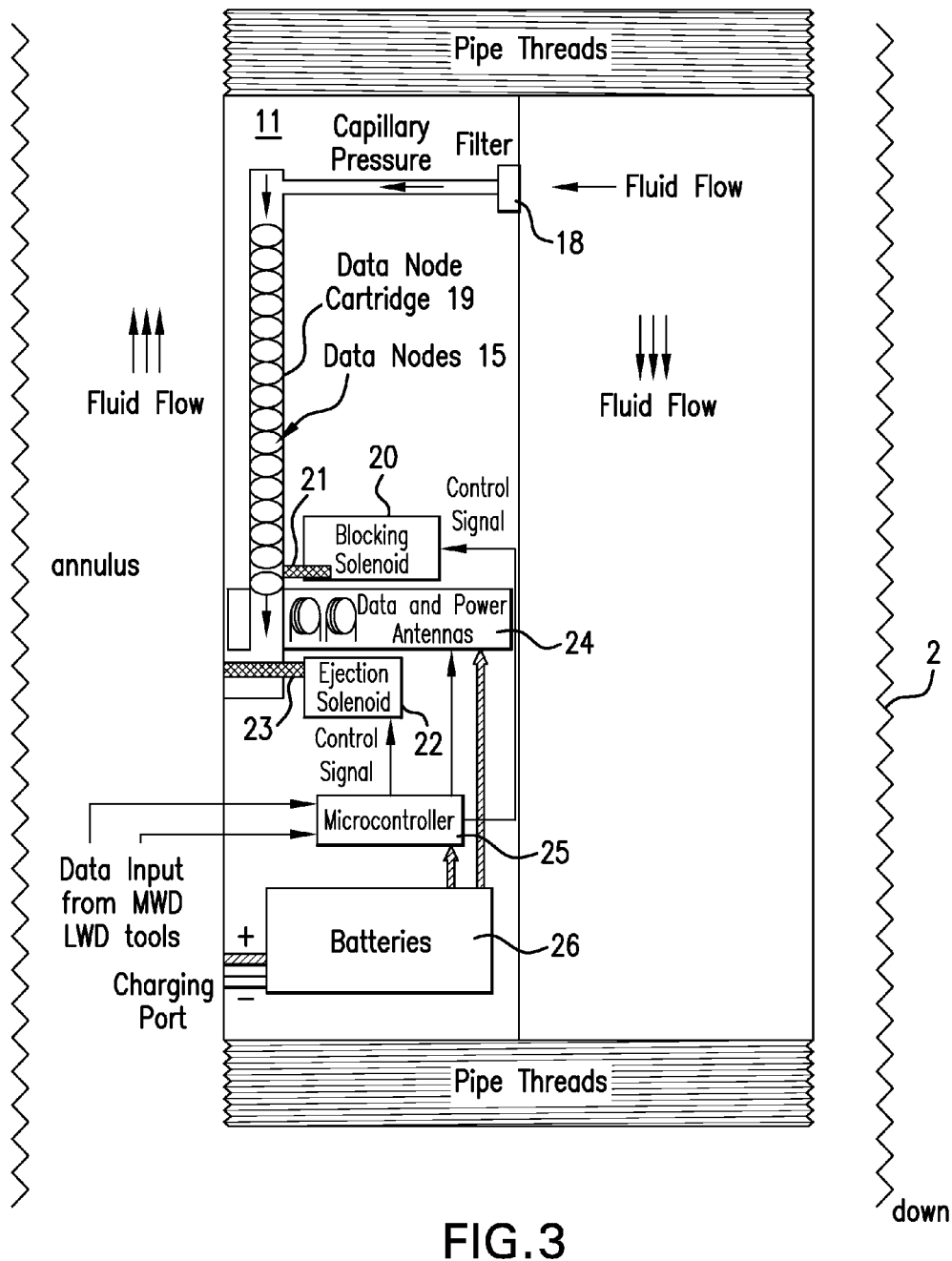
FIGS. 3-6 illustrate details of the data node tool according to embodiments of the invention.
Figure 4:
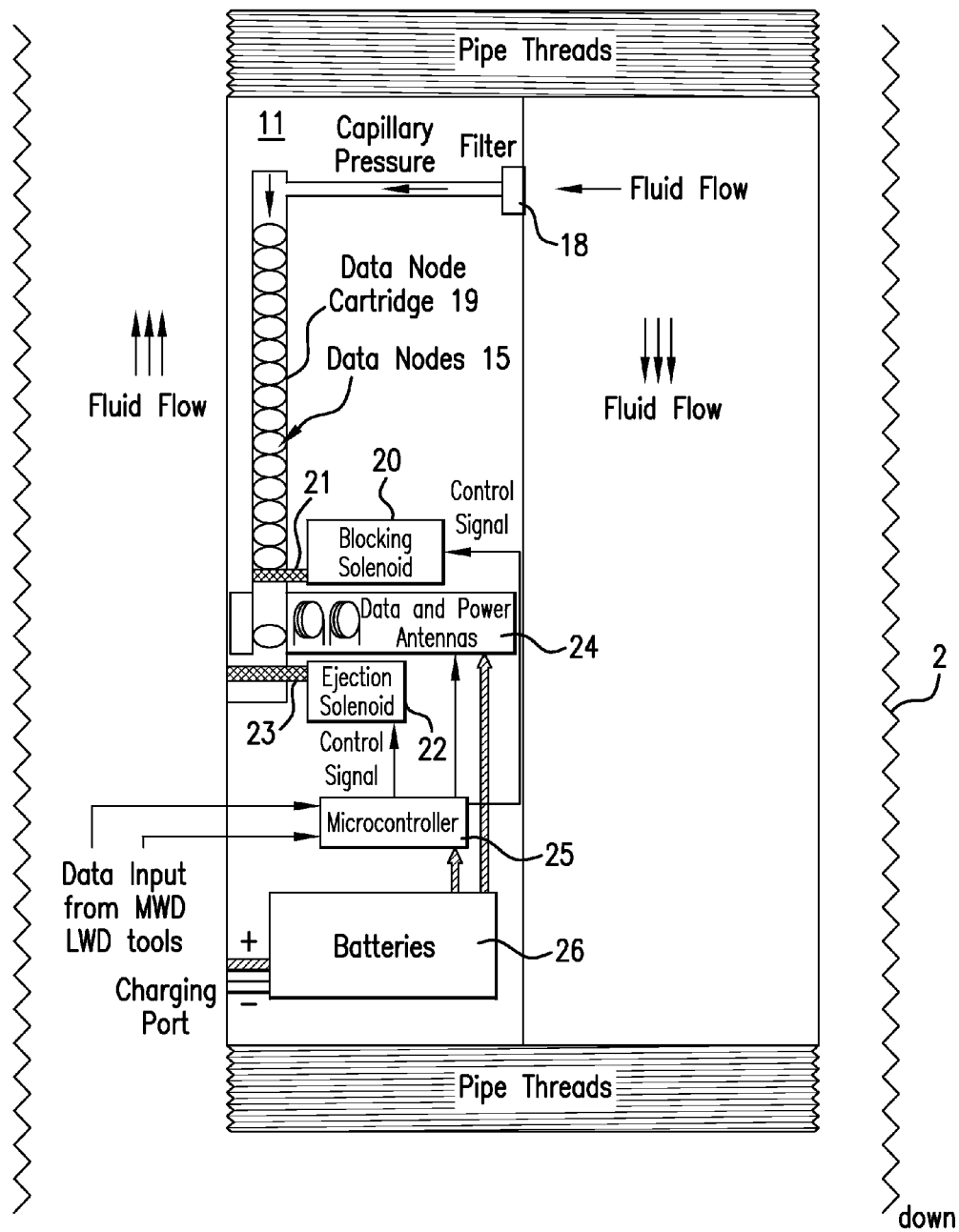
Figure 5:
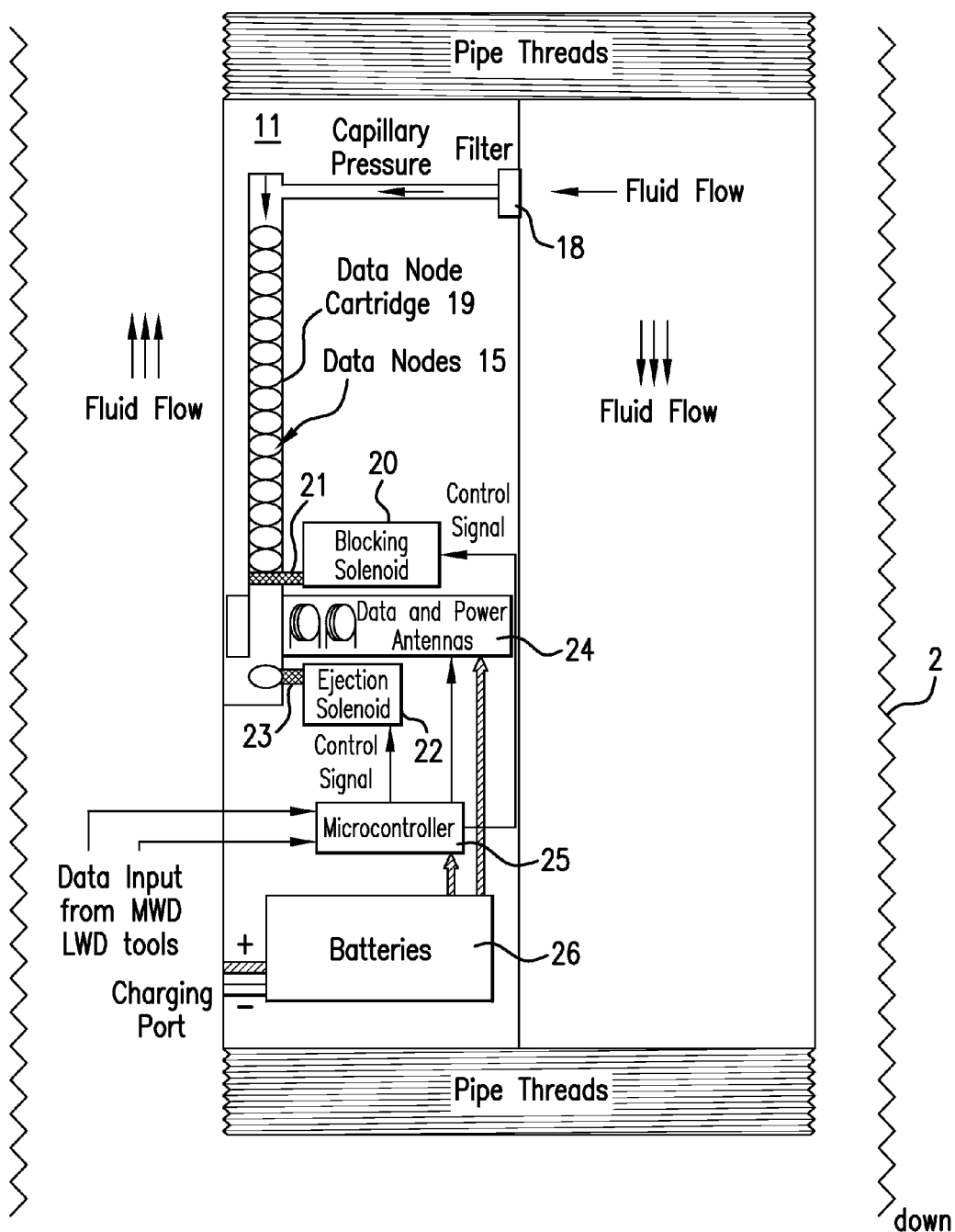
Figure 6:
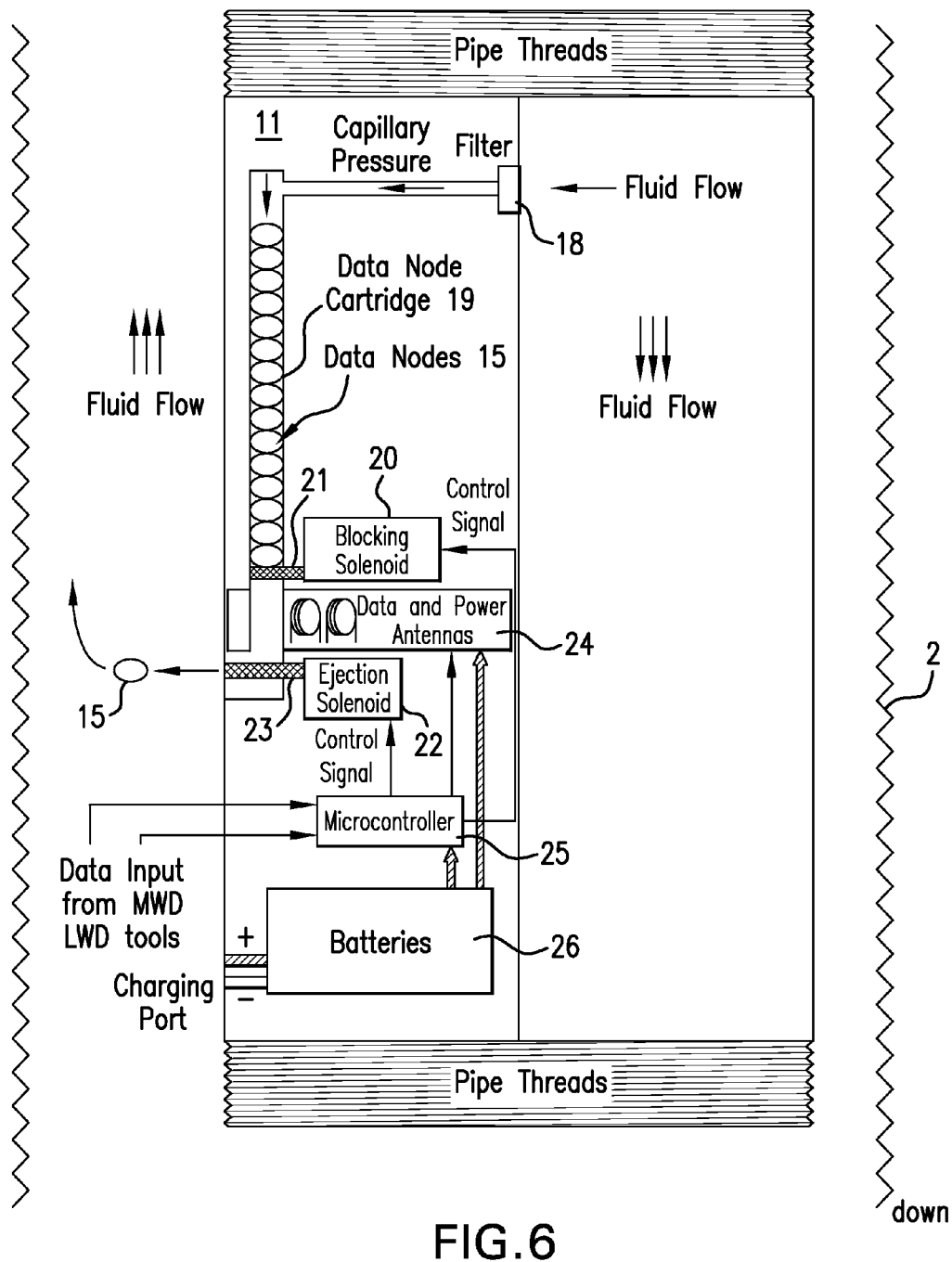

The mechanism by which the microcontroller 25 writes data into and releases a data node 15 is now discussed with reference to FIGS. 3-6. As shown in the current embodiment, a filter 18 is disposed within the data node tool 11 to filter internal drilling fluid flow entering the data node chamber 19. The filter 18 does not entirely block the flow of drilling fluid into the data node cartridge 19. Instead, the filter 18 creates capillary pressure at the top of the data node cartridge 19 such that the data nodes 15 in the data node cartridge 19 are pushed down toward the barrier 21 (which is normally closed at the bottom of the data node cartridge 19 as shown at FIGS. 4-6) rather than floating within the data node cartridge 19. In this way, when the barrier 21 is opened, a data node 15 is released from the data node cartridge 19 into the chamber holding the data and power antennas 24, as detailed below. The microcontroller 25 signals the blocking solenoid 20 to open the barrier 21 so that one data node 15 may drop into a chamber that holds the data and power antennas 24. FIG. 3 shows the barrier 21 open while FIG. 4 shows the barrier 21 re-closed with a data node 15 in the chamber with the antennas 24. The microcontroller 25 may use a timer or signaling to re-close the barrier 21 and ensure that only one data node 15 comes into the chamber at a time. When a data node 15 is in the position shown by FIG. 4, the antennas 24 transmit data from the microcontroller 25 to the data node 15. Specifically, the antennas 24 transmit to the antenna 154 (FIG. 2) of the data node 15 to store the data in the data node 15 memory 152. In addition to keeping the remaining data nodes 15 in the data node cartridge 19, the barrier 21 may act to prevent transmission of the data from the antennas 24 to the remaining data nodes 15 so that only the one data node 15 in the chamber is programmed. In one embodiment, after writing the data, the antennas 24 read the data back out and send it to the microcontroller 25 for verification. In one embodiment, the antennas 24 provide data and power to the data nodes 15. In an exemplary embodiment, the antennas 24 are similar to antennas used to read from and write to radio frequency identification (RFID) devices. If no data could be read back from the data node 15 or if an error is detected in the read-out data, the writing process is repeated until the data in the data node 15 is verified. At this stage, as shown at FIG. 5, the microcontroller 25 signals the ejection solenoid 22 to open the barrier 23 and, as shown at FIG. 6, the microcontroller 25 signals the ejection solenoid 22 to re-close the barrier 23, thereby ejecting the programmed data node 15 into the drilling fluid flow. It can be appreciated that the pressure of the drilling fluid internal to the data node tool 11 is greater than the pressure of the drilling fluid in the annulus. As a result, this pressure differential inside and outside the data node tool 11 aides in the ejection of the programmed data node 15. When the data node 15 floats up to the surface in the drilling fluid, the magnet 16 (FIG. 1) captures the data node 15 for reading by the data node reader 17 (FIG. 1) as discussed above.

In one embodiment, the same data is written into more than one data node 15 for redundancy. That is, if one of the data nodes 15 is unable to be retrieved from the drilling fluid flow by the magnet 16 or is unable to be read by the data node reader 17, then the chances of receiving that data at the surface nonetheless are improved because another data node 15 carries that same data. In different embodiments, the data written into the data nodes 15 may fill in gaps in information telemetered (via mud pulse telemetry, for example). This is because, as noted above, the measurement rate of the MWD/LWD tools 10 may be higher than the data transmission rate of the telemetry system. That is, while data obtained by the MWD/LWD tools 10 at a given interval is telemetered to the surface, data obtained by the MWD/LWD tools 10 at a shorter interval than the given interval is transported to the surface via the data nodes 15. In these embodiments, the low bandwidth telemetering techniques are enhanced by the near real-time data node tool 11. At the computer processing system 13, the telemetered data and the data from the data nodes 15 may be interleaved or otherwise processed together or separately to obtain different types of information.

Figure 7:
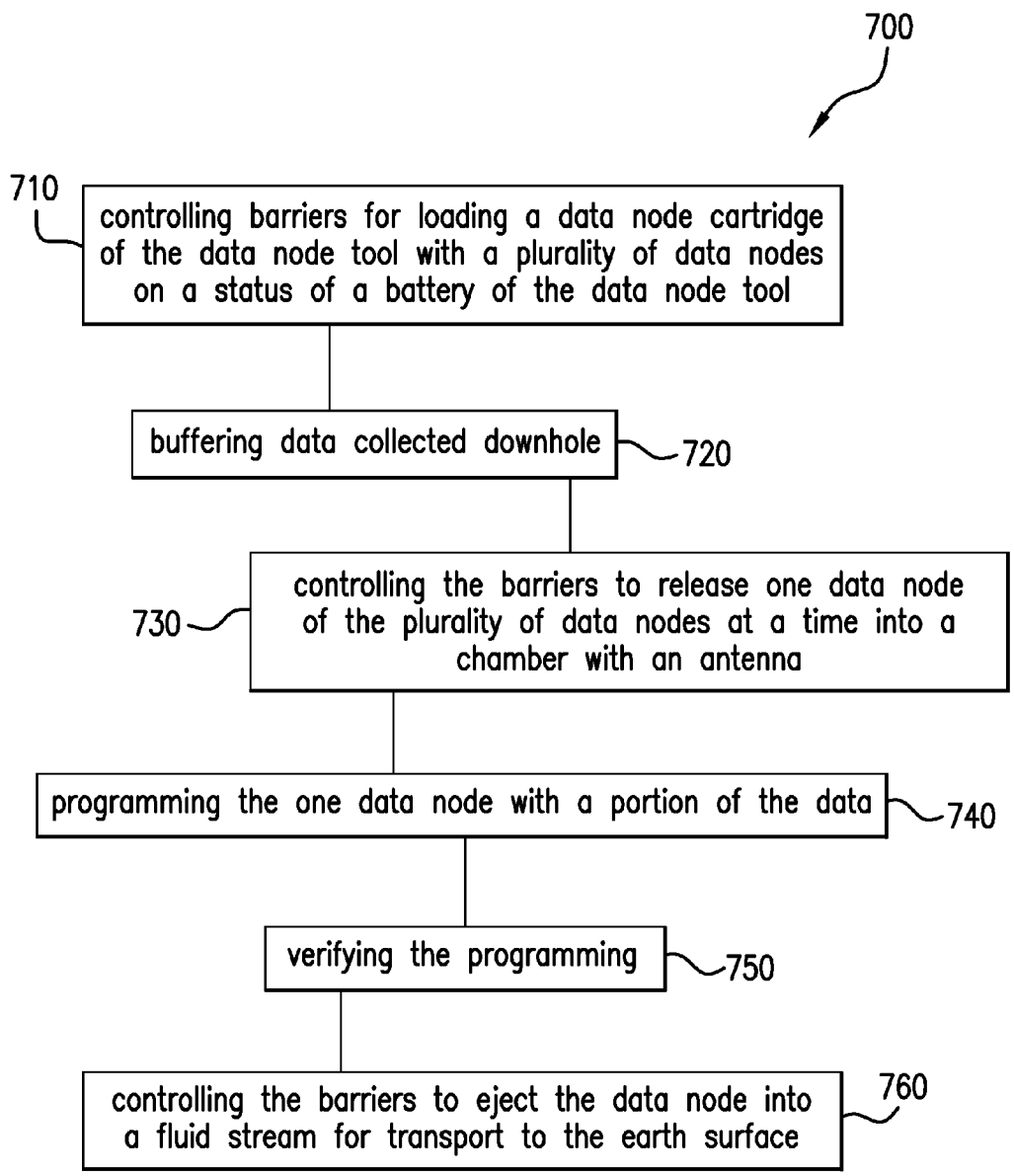
FIG. 7 depicts various processes executed by the microcontroller to transport MWD/LWD data from downhole to the surface of the earth according to embodiments of the invention.

FIG. 7 depicts various processes 700 executed by the microcontroller 25 to transport MWD/LWD data from downhole to the surface of the earth 3 according to embodiments of the invention. The processes 700 include controlling barriers 21, 23 for loading a data node cartridge 19 of the data node tool 11 with the plurality of data nodes 15 based on a status of a battery 26 of the data node tool 11 at 710. As noted above, when the microcontroller 25 senses that the battery 26 is being charged, it signals the solenoids 20, 22 to open the barriers 21, 23 so that the data nodes 14 can be pre-loaded in the data node cartridge 19 before the data node tool 11 is lowered into the borehole 2. Buffering data collected downhole at 720 includes receiving the collected data from the MWD/LWD tools 10. The processes 700 include controlling the barriers 21, 23 to release one data node 15 of the plurality of data nodes 15 at a time into a chamber with an antenna 24 at 730. Specifically, the microcontroller 25 signals the blocking solenoid 20 to open the barrier 21 so that one of the data nodes 15 (being pushed down by capillary pressure caused by the filter 18) comes into the chamber with the data antenna 24. This is followed by programming the one data node 15 with a portion of the data at 740. As noted above, the microcontroller 25 may be triggered to program a data node 15 with data collected by the MWD/LWD tools 10 based on an amount of data, a length of time, or other parameter. Also, more than one data node 15 may be programmed with the same data for redundancy, and each data node 15 may only be programmed with a portion of the collected data or with all of the collected data at a given time. The processes 700 include verifying the programming at 750. This involves the microcontroller 25 reading out the data that was written to the data node 15 to verify it. At 760, controlling the barriers 21, 23 to eject the data node 15 into a drilling fluid stream for transport to the earth 3 surface may be based on the verifying. That is, the microcontroller 25 may not signal the ejection solenoid 22 to open the barrier 23 to allow the programmed data node 15 into the drilling fluid stream until it has verified that the data node 15 is correctly programmed with the MWD/LWD data. It can appreciated that the data node tool 11 can be used to transport data from any downhole tool and is not limited to use in conjunction with data form MWD/LWD tools 10.

In support of the teachings herein, various analysis components may be used, including a digital and/or an analog system. For example, the downhole electronics 9, the computer processing system 13, the microcontroller 25, or the data nodes 15 may include the digital and/or analog system. Each system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method executed by a microcontroller of a data node tool to transport data from a downhole tool operating in a borehole penetrating the earth to a receiver at the earth surface, the method comprising:

controlling barriers for loading a data node cartridge of the data node tool with a plurality of data nodes;

buffering data collected downhole by the downhole tool and transmitted to the microcontroller;

controlling the barriers to release one data node of the plurality of data nodes at a time into a chamber with an antenna based on a microcontroller signaling one solenoid to open one of the barriers to release the one data node into the chamber;

programming the one data node with a portion of the data received from the downhole tool; and controlling the barriers to eject the one data node into a fluid stream for transport to the earth surface, wherein the controlling the barriers includes the microcontroller signaling another solenoid to open another one of the barriers to eject the one data node into the fluid stream.

2. The method according to claim 1, further comprising:
verifying the programming, wherein the controlling the barriers to eject the data node is executed based on the verifying.

3. The method according to claim 2, wherein the verifying the programming includes reading the one data node and re-programming the one data node when the reading result is not the portion of the data written to the one data node.

4. The method according to claim 1, wherein the controlling the barriers for loading the data node cartridge includes the microcontroller sensing that a battery of the data node tool is being charged.

5. A system to transport data collected in a borehole penetrating the earth to a surface location, the system comprising:
one or more measurement tools disposed in the borehole, the one or more measurement tools configured to collect data relating to the borehole and a formation penetrated by the borehole; and
a data node tool disposed in the borehole with a plurality of data nodes, the data node tool being configured to receive the data from the one or more measurement tools, program one or more data nodes with at least a first portion of the data, and eject the one or more data nodes into a fluid stream for transport to the surface location, wherein the data node tool comprises a data node cartridge configured to hold the plurality of data nodes when the data node tool is disposed in the borehole, the data node tool comprises barriers configured to block an opening of the data node cartridge and a microcontroller configured to control operation of the barriers, and the microcontroller controls the operation of the barriers by signaling solenoids that operate the barriers, wherein the microcontroller signals one of the solenoids to open one of the barriers to release one data node at a time from the data node cartridge, programs the one data node, and signals another one of the solenoids to open another one of the barriers to eject the one data node into the fluid stream.

6. The system according to claim 5, wherein the plurality of data nodes include a buoyancy chamber so that the one or more data nodes float in the fluid stream.

7. The system according to claim 5, further comprising:
a downhole processor configured to perform telemetry of a second portion of the data to the surface location; and
a surface processor configured to process the first portion of the data in the one or more data nodes and the second portion of the data at the surface location.

8. The system according to claim 7, wherein at least part of the first portion of the data and the second portion of the data is the same.

9. The system according to claim 7, wherein the first portion of the data is at a higher data rate than the second portion of the data.

10. The system according to claim 7, further comprising a data node reader at the surface location, the data node reader being configured to read the first portion of the data in the one or more data nodes and send the first portion of the data to the surface processor.

11. The system according to claim 10, further comprising a magnet disposed at the surface location, wherein the plurality of data nodes include a metal insert and the magnet captures and sends, to the data node reader, the one or more data nodes ejected into the fluid stream at the surface location.

12. The system according to claim 5, wherein the microcontroller signals the solenoids to open the barriers to load data nodes into the data node cartridge when the microcontroller senses that a battery of the data node tool is being charged prior to disposing the data node tool in the borehole.

13. The system according to claim 5, wherein the data node tool comprises a filter configured to create capillary pressure in the data node cartridge at a different opening of the data node cartridge from the opening blocked by the barriers so that the plurality of data nodes in the data node cartridge are pushed toward the barriers.

14. A non-transitory computer-readable medium storing instructions therein which, when processed by a computer processor, cause the processor to perform a method to transport data from a measurement tool operating in a borehole penetrating the earth to a processor at the earth surface via a plurality of data nodes, the method comprising:
controlling barriers for loading a data node cartridge of the data node tool with the plurality of data nodes based on a status of a battery of the data node tool;
buffering data collected downhole by the measurement tool and transmitted to the microcontroller;
controlling the barriers to release one data node of the plurality of data nodes at a time into a chamber with an antenna based on signaling one solenoid to open one of the barriers to release the one data node into the chamber;
programming the one data node with a portion of the data received from the measurement tool; and
controlling the barriers to eject the one data node into a fluid stream for transport to the earth surface, wherein the controlling the barriers includes signaling another solenoid to open another one of the barriers to eject the one data node into the fluid stream.

\* \* \* \* \*